United States Patent [19]
Buckley et al.

[11] Patent Number: 5,647,459
[45] Date of Patent: Jul. 15, 1997

[54] PARKING BRAKE

[75] Inventors: James A. Buckley, Whitefish Bay; Curt H. Blaszczyk, Sturtevant; James J. Dimsey, Brown Deer, all of Wis.

[73] Assignee: Hayes Industrial Brake, Inc., Mequon, Wis.

[21] Appl. No.: 670,732

[22] Filed: Jun. 21, 1996

Related U.S. Application Data

[63] Continuation-in-part of Ser. No. 441,961, May 16, 1995, Pat. No. 5,529,150.

[51] Int. Cl.⁶ ............................ F16D 65/56; F16D 65/54
[52] U.S. Cl. ...................... 188/72.9; 188/73.45; 403/32
[58] Field of Search ........................ 188/73.43, 73.44, 188/73.45, 73.46, 71.7, 71.8, 71.9, 72.7, 72.8, 72.9, 106 F, 196 D; 267/158–164; 403/32

[56] References Cited

U.S. PATENT DOCUMENTS

| | | | |
|---|---|---|---|
| 4,436,186 | 3/1984 | Ritsewa et al. | 188/73.44 |
| 4,807,725 | 2/1989 | Weiler et al. | 188/73.44 |
| 4,832,161 | 5/1989 | Weiler et al. | 188/73.44 |
| 5,038,895 | 8/1991 | Evans | 188/72.9 |
| 5,060,765 | 10/1991 | Meyer | 188/72.7 |
| 5,111,914 | 5/1992 | Thiel et al. | 188/73.45 |
| 5,195,386 | 3/1993 | Havens et al. | 188/72.9 |
| 5,529,150 | 6/1996 | Buckley et al. | 188/72.9 |

*Primary Examiner*—Robert J. Oberleitmer
*Assistant Examiner*—Chris Schwartz
*Attorney, Agent, or Firm*—Foley & Lardner

[57] ABSTRACT

A heavy duty brake assembly including a caliper mounted on a housing in a position to bridge a brake disc, a pair of screws mounted on the housing, a bushing and a washer mounted on each of the screws, a notch formed in the periphery of each of the bushings intermediate the ends thereof, a self-adjusting repeatable retraction device mounted on each of the bushings for supporting the caliper, the device including a plastic sleeve mounted on each of the bushings, a pair of tabs formed in each of the sleeves and aligned with the notches to limit the paths of travel of the sleeve with respect to the bushings, a bell spring formed on one end of each of the sleeves for biasing the caliper to a neutral position with respect to the disc and a seal formed on each end of the plastic sleeve to seal the sleeve to the bushing.

10 Claims, 8 Drawing Sheets

PARKING BRAKE

RELATED APPLICATION

This application is a continuation-in-part of prior co-pending United States patent application Ser. No. 08/441,961, filed May 16, 1995, entitled "Parking Brake," now U.S. Pat. No. 5,529,150.

FIELD OF THE INVENTION

The present invention relates to floating type caliper brakes and more particularly to a high torque lever actuated parking brake caliper.

BACKGROUND OF THE INVENTION

Parking brakes for heavy duty construction and off road equipment have been relatively expensive. This was due to the elaborate mounting structures required which were both expensive, lacked durability and corrosion resistance. These previous designs, except for the very high and expensive ones, have also lacked environmental and corrosion protection in their actuation mechanism.

The desire in any disc brake system is to apply the brake force to the disc on demand and to release this clamp force completely on demand. In single acting caliper brakes, those that apply their clamping force from one side of the caliper and allow the brake housing to freely float into contact with the disc, release is always a problem. The actuator is released readily as in a retracting hydraulic piston but the caliper housing and its caliper side friction material stay in contact with the disc with a force equal to the force it takes to move it on its mounts. With seals this force can be substantial. The force causes the friction pad to continue dragging on the disc resulting in premature pad wear, unwanted noise, unnecessary heat and vehicle energy loss.

SUMMARY OF THE PRESENT INVENTION

The present invention relates to a high torque lever actuated disc brake having a floating caliper housing for supporting a brake pad on each side of the brake disc and to a ball type actuator for moving the brake pads into engagement with the disc.

The park brake presented here utilizes a novel, heavy duty, fully sealed mounting assembly, centered over the brake disc, that when mounted onto the vehicle's transmission eliminates the problems associated with previous designs as well as negating deflections, all at a major cost reduction to the customer.

This brake design seals and protects the functional mechanism in very low cost fashion. This design also innovates the fabrication of the friction material by using an integral reinforcing structure while eliminating extra parts or expensive attachment methods. The long term durability of this design comes from both its sealing system as well as its use of proven ball and ramp technology.

The mounting system proposed herein eliminates these problems in a very economical fashion. The system allows for independent retraction of the caliper housing in a direction opposite the actuators retraction and half its distance resulting in equal running clearance to both sides of the disc. The retraction is of a precision and repeatable value and is self-compensating for pad wear. Specifically as the friction pad wears there is slip between the housing and the bushing allowing the spring retraction of the housing to stay constant.

A primary feature of the invention is the provision of a park brake having a one piece rotor with a number of constant angle ball ramps wherein each ramp includes a back stop to prevent actuation in the off position.

A further feature of the invention is the use of a one piece rotor having constant angle ball ramps equally spaced around one face of the rotor for supporting a corresponding number of balls for moving the brake pads into engagement with a brake disc.

A further feature of the invention is the use of a plastic cap to seal the ball ramp mechanism and thereby prolong the life of the mechanism and preserve its high efficiency.

A further feature of the invention is the provision of a sealed mount for supporting the floating caliper and more particularly to a sealed mount which is mounted directly over the brake disc thereby providing for a minimum of flexure of the sealed mount.

Another feature of the invention relates to a ball ramp rotor having a back stop in each ball ramp to establish the off point at installation simplifying the linkage set up.

Another feature of the invention is the use of a ball spacer which maintains squareness, efficiency and durability of the device by maintaining equal angular ball spacing in all adjustment positions.

A further feature of the invention is the use of one piece brake pads formed from a fiberglass phenolic friction material having a fiber backing thereby eliminating the use of any bonding or rivets.

Another feature of the invention is the use of "D" shaped brake pads which prevent rotation of the brake pads.

A further feature of the mount is the sealing provision of seals to the housing, the mount bushings and the washers.

One of the primary advantages of the invention is the provision for constant positive retraction of the housing from the disc.

A further feature relates to the self-compensation for the housing pad wear ensuring consistent clearance of pad to disc throughout life of the pad.

Further features relate to ease of assembly of the mount, fewer parts for simplicity and low cost and few tolerances to achieve goals.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 1:
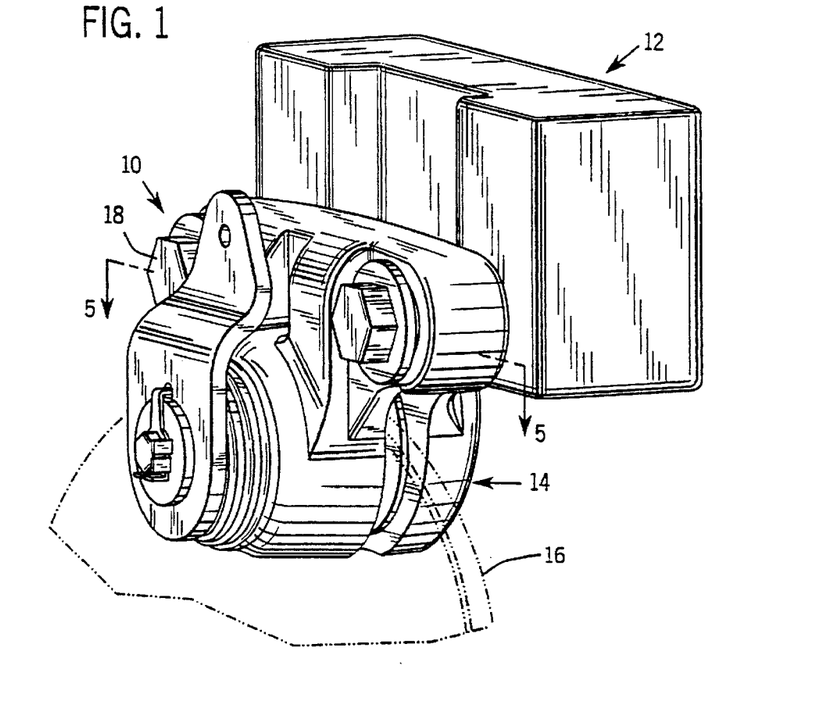
FIG. 1 is a perspective view of the brake assembly shown mounted on a transmission housing.
Figure 3:
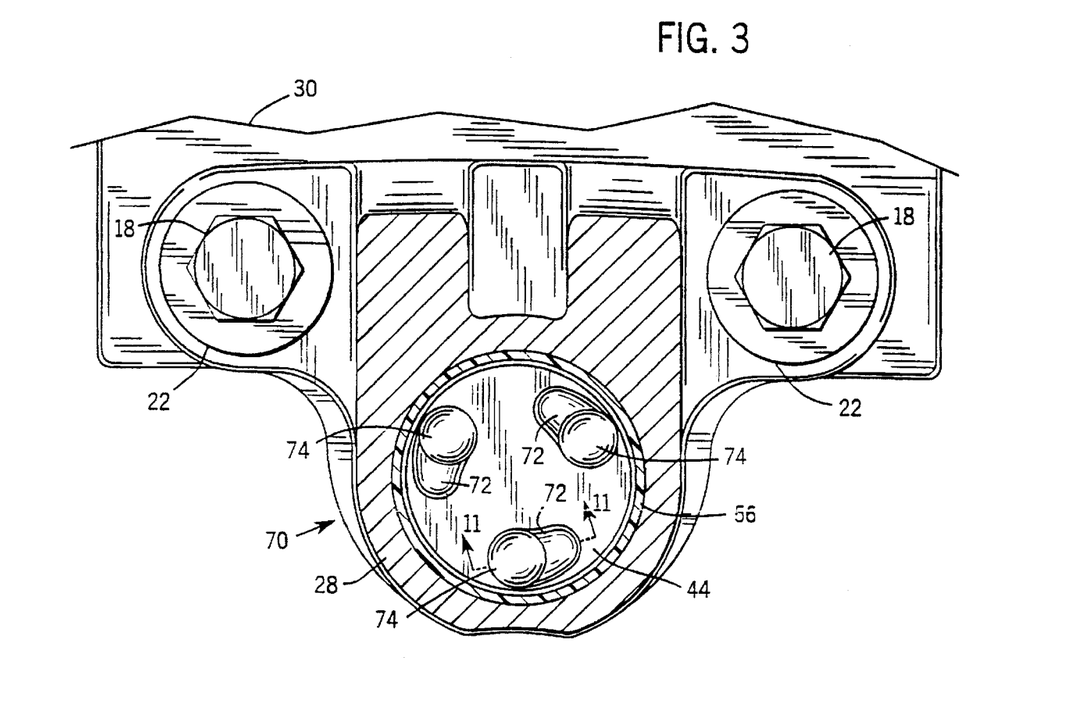
FIG. 3 is a view taken on line 3—3 of FIG. 2.
Figures 4, 5:
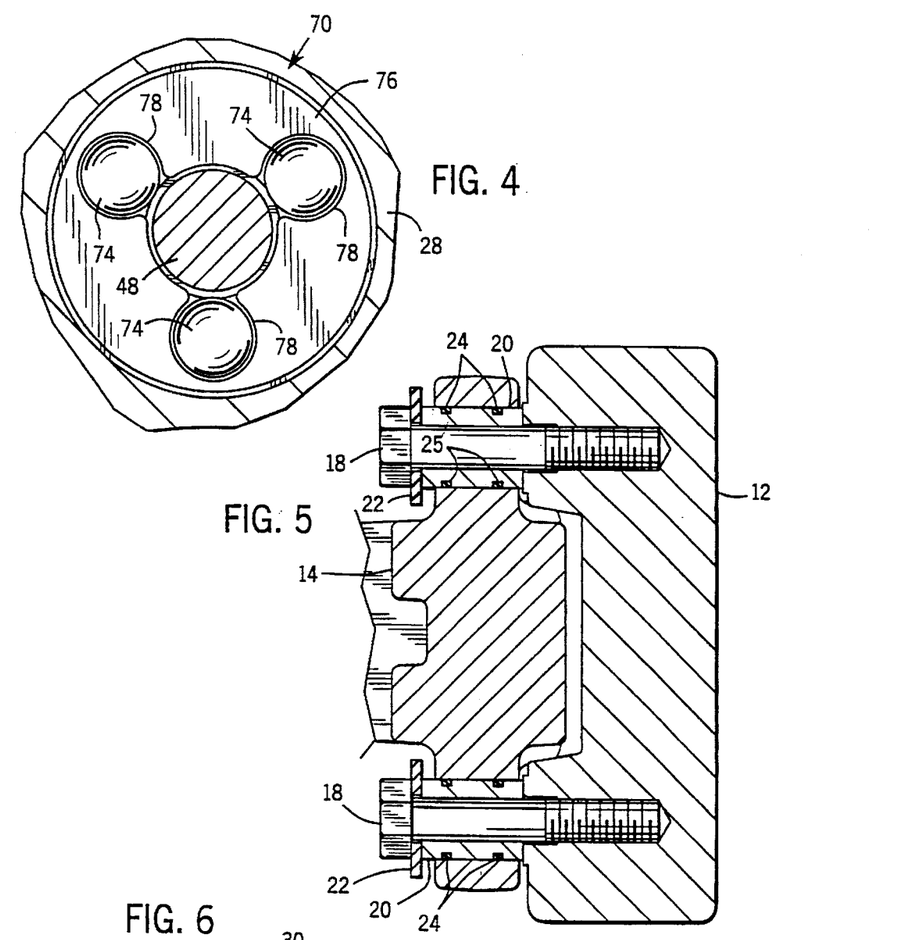
FIG. 4 is a view taken on line 4—4 of FIG. 2.
FIG. 5 is a cross section view taken on line 5—5 of FIG. 1.

The caliper disc brake 10 according to the present invention and as shown in FIGS. 1, 3 and 5 is shown mounted on a transmission housing 12. The disc brake generally includes a U-shaped caliper 14 which is positioned to bridge a rotary disc 16. The caliper 14 as shown in FIGS. 1 and 5 is mounted on the transmission housing 12 by means of a pair of screws 18. A bushing 20 and a washer 22 are mounted on each of the screws 18. The bushings are coated with a dry lubricant such as PTFE or graphite which lubricates and protects the bushing from corrosion. A pair of O-ring seals 24 may be provided in either the caliper or the bushing such that the caliper is free to move with respect to the bushing 20.

Figure 2:
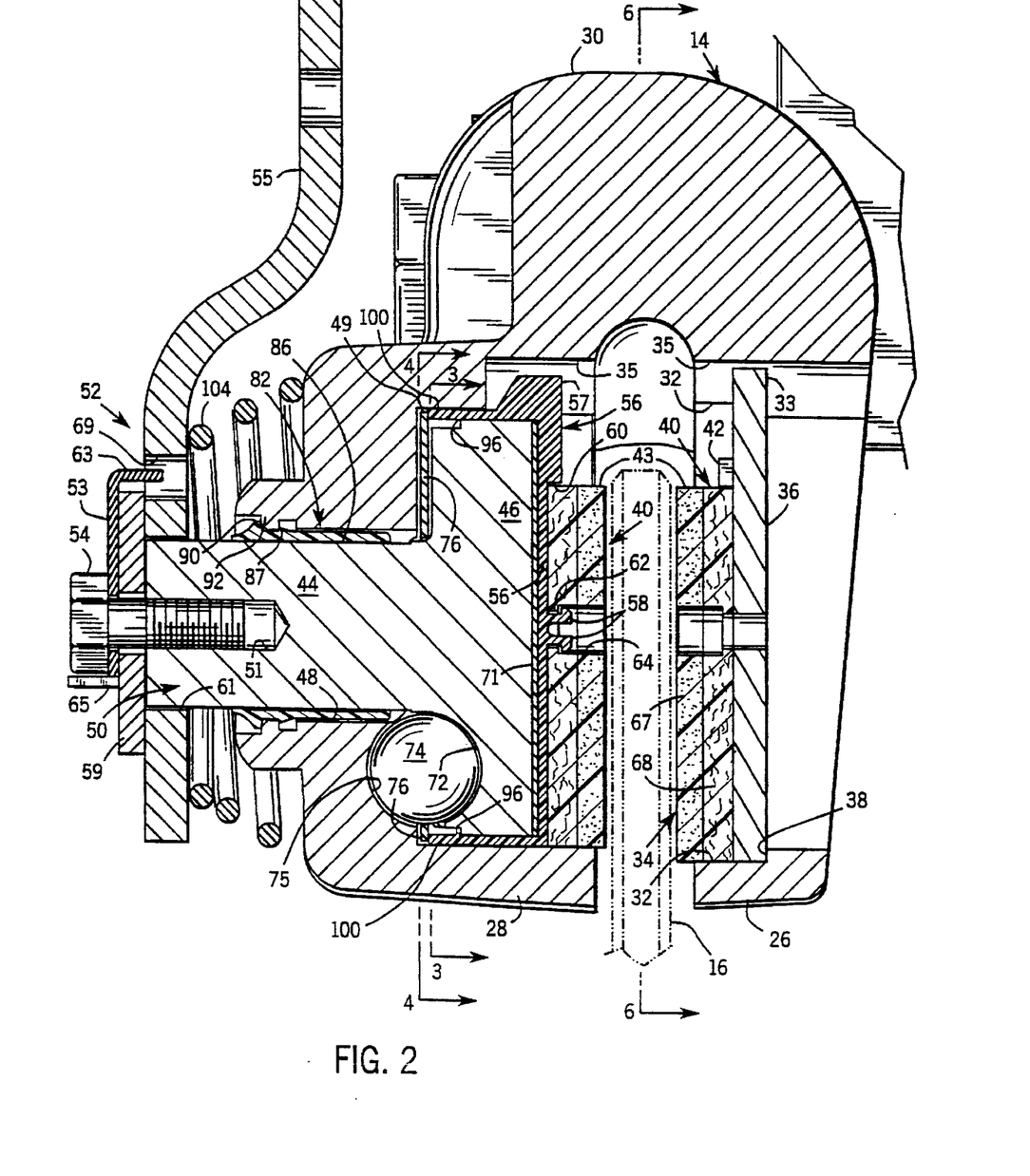
FIG. 2 is a cross section view of the brake assembly showing the rotor mount and friction pads.
Figure 6:
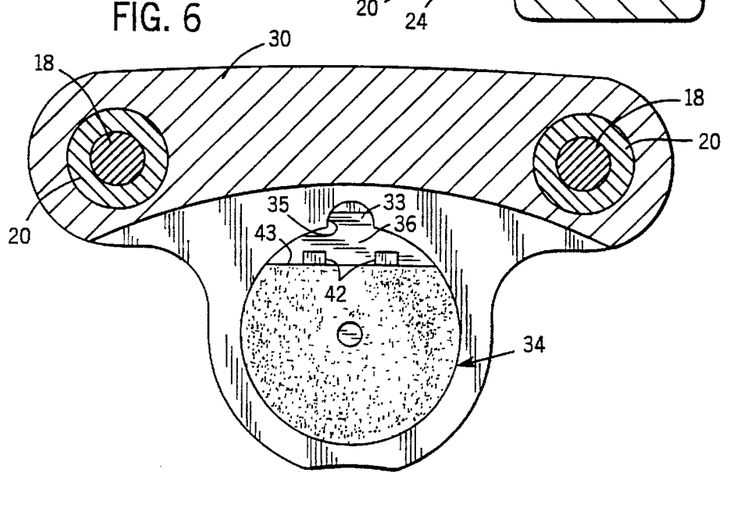
FIG. 6 is a cross section view taken on line 6—6 of FIG. 2.

A cross section of caliper 14 is shown in FIG. 2. The caliper 14 includes a leg 26 on the inboard side of the disc 16 and a leg 28 on the outboard side of disc 16 which are interconnected by a bridge section 30. The inboard leg 26 includes an opening 38 having a recess 32 around the perimeter of the opening 38 and a notch 35 at the upper end of the opening. A brake pad assembly 34 is mounted in the recess 32 in a position to engage the disc 16. The brake pad assembly 34 includes a backing plate 36 and a brake pad 40 mounted on the inside of plate 36. The backing plate 36 is seated in the recess 32. A tab 33 is provided at the top of the plate 36 which is aligned with notch 35 in the bridge section 30 to prevent rotation of the backing plate 36. A pair of stops 42 are provided on the face of the backing plate 36 as shown in FIG. 6. The brake pad 40 is seated in the opening 32 in abutting relation to the backing plate 36. A flat surface 43 is provided across the top of the friction pad 40 which engages the stops 42 on the top to prevent rotation of the assembly 34.

A rotor 50 is mounted in the outboard leg 28 as shown in FIG. 2. The rotor 50 includes a shaft 44 and a head 46. The shaft 44 is aligned with a bore 48 in the leg 28 and the head 46 is aligned in a bore 49 in the leg 28. A lever assembly 52 is secured to the end of the shaft 44 by means of a bolt 54 which is screwed into a threaded opening 51 in the shaft 44. The lever assembly 52 includes a lever 55, a bolt keeper 53, and a washer 59. The lever 55 includes a spliced opening 61 and is bent to overlie the center of the rotor seal 82. The bolt keeper 53 is mounted on the bolt 54 to prevent rotation of bolt 54. In this regard the bolt keeper 53 includes a tab 63 which is aligned with an opening 69 in lever 55. The bolt keeper also includes two pairs of tabs 65 one of which is bent into engagement with the head of bolt 54 to prevent rotation after mounting the bolt in the threaded opening 51. A 500 lb. input on a 4 inch hole center provides about 9000 lb. clamping force.

A plastic cap 56 is mounted on the head 46 of the rotor 50. The cap 56 includes a tab 57 which is aligned with the notch 35 in the bridge section to prevent rotation of the cap 56. A thrust washer 71 may be positioned between the cap 56 and the face of the head 46. A ledge 60 is provided across the face of the cap 56. A friction pad 40 is secured to the face of cap 56 by means of a pair of tabs 58 which matingly engage a shoulder 62 provided at the end of an opening 64 in the pad 40. The flat surface 43 of the pad 40 abuts the ledge 60 to prevent rotation of the pad 40.

The friction pads 40 may be identical in configuration and in composition. In this regard, the pads 40 are made of a fiberglass phenolic material 67 which is fully supported on a fiber backing 68, the backing being many times as strong as the friction material eliminating the need for a steel backing plate. Adjustment for pad wear may be accomplished by shortening the cable or linkage connected to the lever 55 and/or repositioning of the lever 55 to the next tooth of a spline provided on the end of shaft 44. In this regard, the spline is not shown, however, it may be provided on the end of shaft 44. The lever 53 would also include a corresponding spline opening which would matingly engage the spline on the end of shaft 44. The lever would be removed from the shaft 44 by backing off the bolt 54 and resetting the lever to the next spline tooth.

The rotor 50 is moved axially in the opening 48 on rotation of the lever assembly 52 by means of a ball ramp assembly 70 provided between the rotor 50 and the outboard leg 28 as shown in FIGS. 2, 3, 4 and 11. The ball ramp assembly 70 includes three constant angle ramps 72A provided in the back of the head 46 of the rotor 50 and three constant angle ramps 72B in leg 28. A corresponding number of ball pockets 75 are provided in the leg 28 and in the head 46. A ball 74 is seated in each of the pockets 75 in alignment with the ramps 72A and 72B. A ball retainer or spacer 76, as shown in FIG. 4, is provided with three openings 78 which keep the balls 120° apart. This is significant in maintaining equilibrium when the balls are moved between the on and off positions. A backstop 80A is provided at the end of each ball ramp 72A to establish the off point on installation and preventing inadvertent movement in the reverse direction. The ball retainer 76 allows the rotor home position to be other than fully against the back stop 80 while keeping the proper angular position of the balls 74 to their mating pockets after linkage adjustment for pad wear has occurred.

Figure 7:
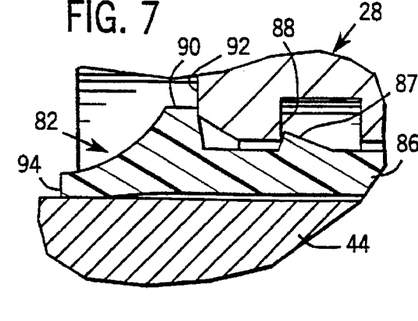
FIG. 7 is a cross section view of the shaft seal.
Figure 8:
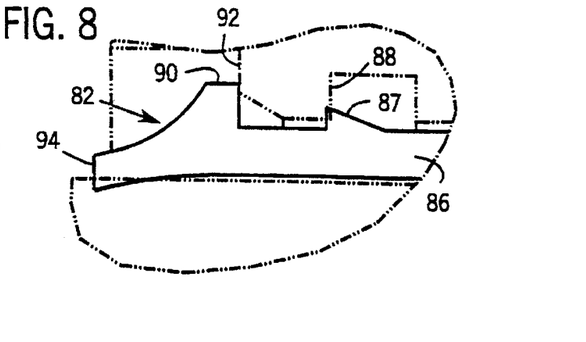
FIG. 8 is a cross section view of the shaft seal with the shaft and housing shown in phantom.

The ball ramp assembly 70 is sealed in the leg 28 by means of a rotor seal 82 mounted in the bore 48 and a crush seal 100 provided on the cap 56. Referring to FIGS. 2, 7 and 8, the rotor seal 82 is in the form of a sleeve 86 formed from plastic material which has a diameter slightly greater than the diameter of the shaft 44 except at opening 94. The seal 82 as shown in FIGS. 7 and 8 includes a first rib 87 which is aligned with the inner edge 88 of a flange 92 provided in bore 48. A second flange 90 is positioned to engage the outer edge of flange 92 to retain the rotor seal 82 in position. It should be noted in FIG. 8 that the opening 94 at the end of the rotor seal 82 is smaller than the diameter of the shaft 44 creating an interference type seal. On assembly of the shaft 44 through the rotor seal 82, the opening 94 will expand as shown in FIG. 7 to physically engage the shaft 44.

Figure 9:
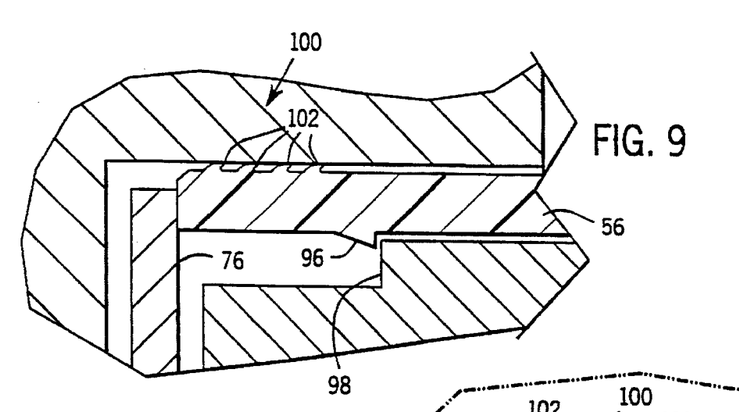
FIG. 9 is a cross section view of the rotor seal formed on the end of the cap.
Figure 10:
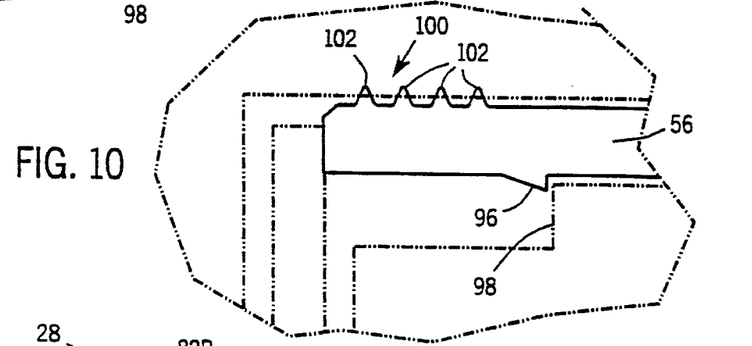
FIG. 10 is an enlarged view of the rotor seal on the cap shown in phantom.
Figure 11:
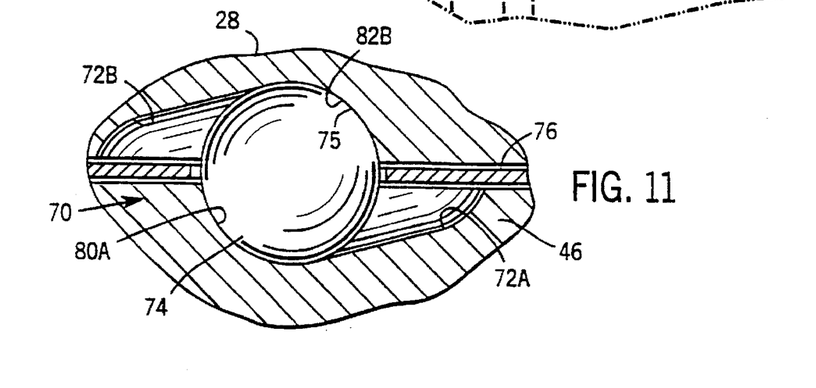
FIG. 11 is a section view of one of the balls shown in one of the ramps and retained therein by the ball spacer.

The seal formed by the plastic cap 56, as shown in FIGS. 9 and 10, includes a retaining ring 96 formed on the inner surface of the cap 56 in a position to engage a shoulder 98 provided on the head 46. A crush seal 100 in the form of a number of flanges 102 is provided on the outer surface of the cap 56 as shown in FIG. 10. The flanges 102 are crushed as shown in FIG. 9 when the cap 56 is inserted into the recess 49 in the outboard leg 28. A spring 104 may be provided between the leg 28 and the lever 55 to bias the rotor 50 to the inoperable position.

Figure 12:
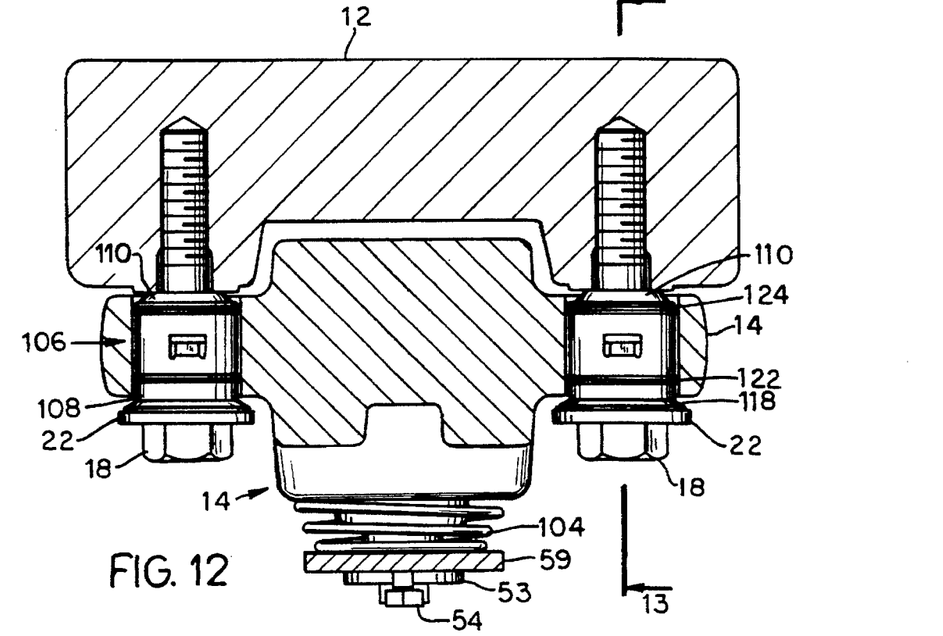
FIG. 12 is a view similar to FIG. 5 showing the modified bushing assembly.
Figure 13:
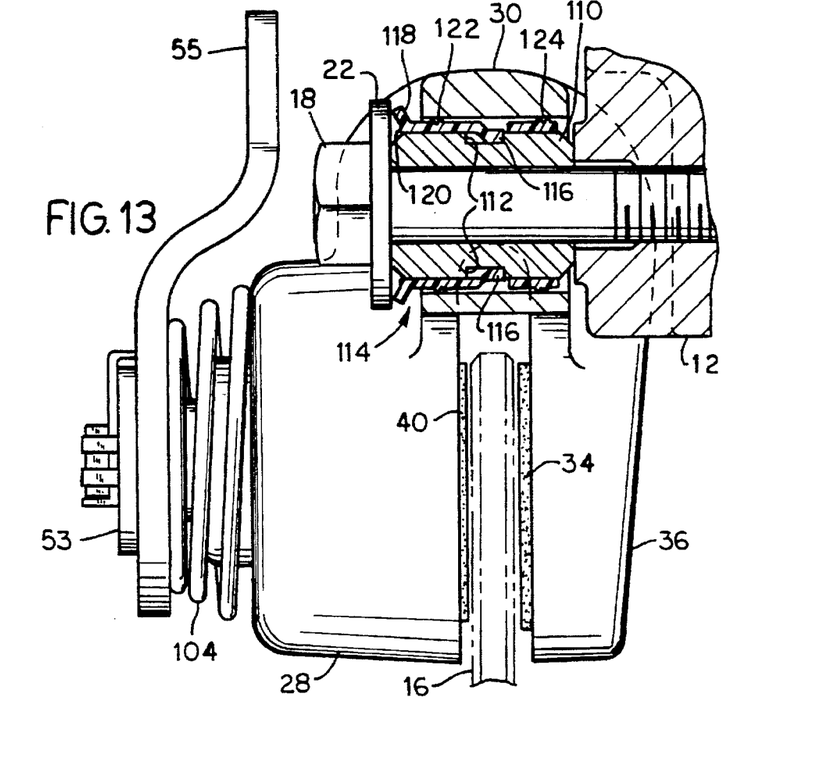
FIG. 13 is a cross section view taken on line 13—13.

In an alternate arrangement, as shown in FIGS. 12 and 13, a modified bushing assembly 106 is shown which adjusts the position of the caliper housing to prevent unnecessary wear of the brake pad 34. In this regard a bushing 110 is mounted on each of the bolts 18. A notch 112 is provided around the bushing 110 intermediate the ends thereof. A plastic sleeve 114 is slidably mounted on the bushing 110. The sleeve 114 is provided with a tab 116 on each side which is bent inward into alignment with the notch 112 in the bushing 110. The tabs 116 limit the axial movement of the sleeve 114 on the bushing 110 in one direction. The sleeve 114 moves axially with respect to the caliper 30 if adequate force is applied. Crush seals 122 and 124 are provided on each end of the sleeve 114 to seal the sleeve 114 in the caliper 30 and provide adequate frictional force between the sleeve 114 and the caliper 30 to overcome the spring force to deflect the flange 118 until stop 120 bottoms on the flange 22.

A bell spring in the form of a flange 118 is formed on one end of the sleeve 114 which extends radially angularly outward beyond the end of the sleeve 114. The flange 118 is sufficiently flexible to allow the end 120 of the sleeve 114 to engage the washer 22, forcing the flange 118 to bend slightly into engagement with the washer 22 because of the groove abutment 112. On release of the brake, the friction pad 40 on the rotor 50 will be withdrawn from the brake disc 16. At the same time, the flange 118 will withdraw the housing 14 slightly to release the brake pad 34 mounted on the housing from the disc 16, an amount equal to one half the retraction of the pad 40.

Figure 14:
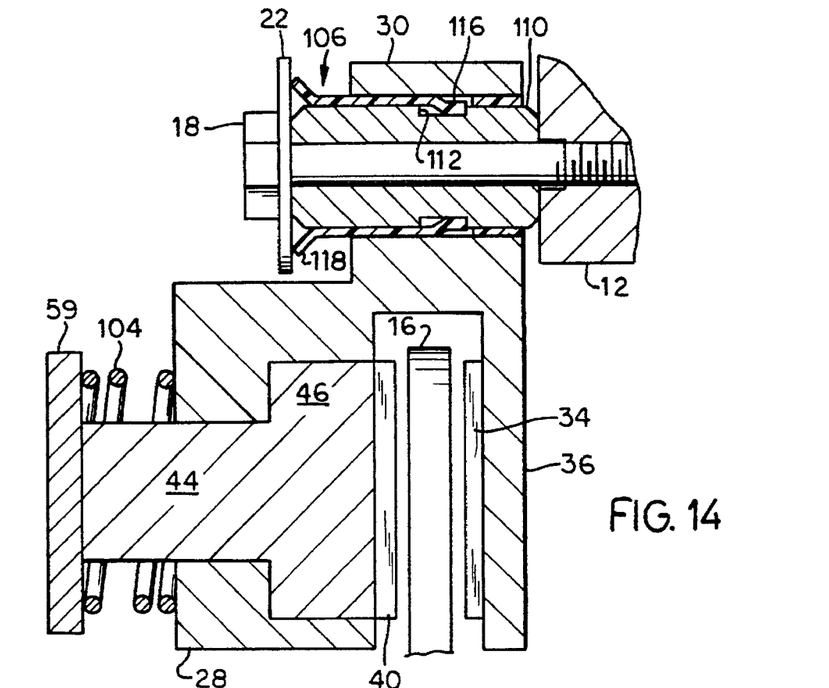
FIG. 14 is a schematic representation of the modified bushing assembly in the open position.
Figure 15:
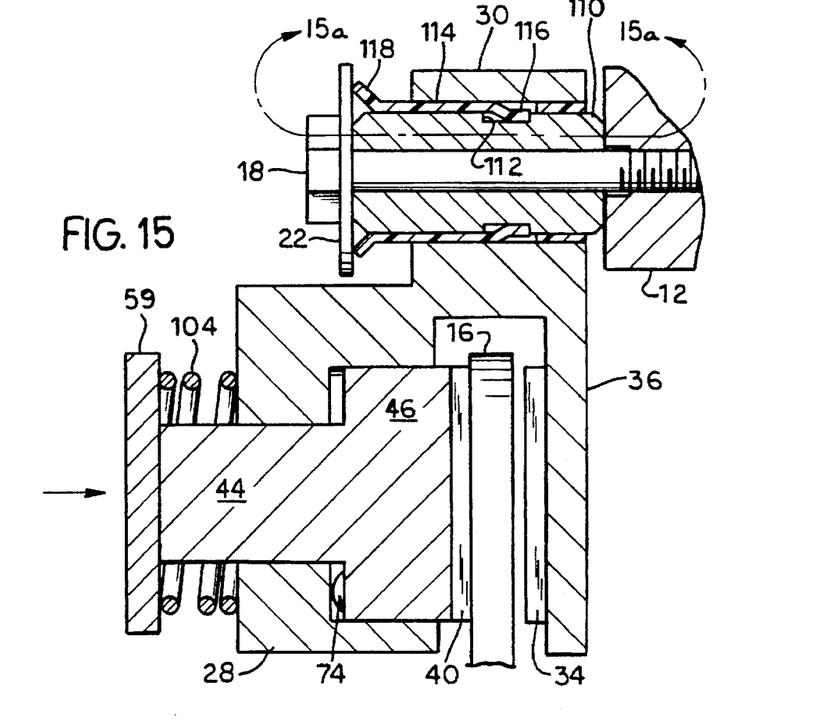
FIG. 15 is a view similar to FIG. 14 showing the initial movement of the head into engagement with the disc.
Figure 15A:
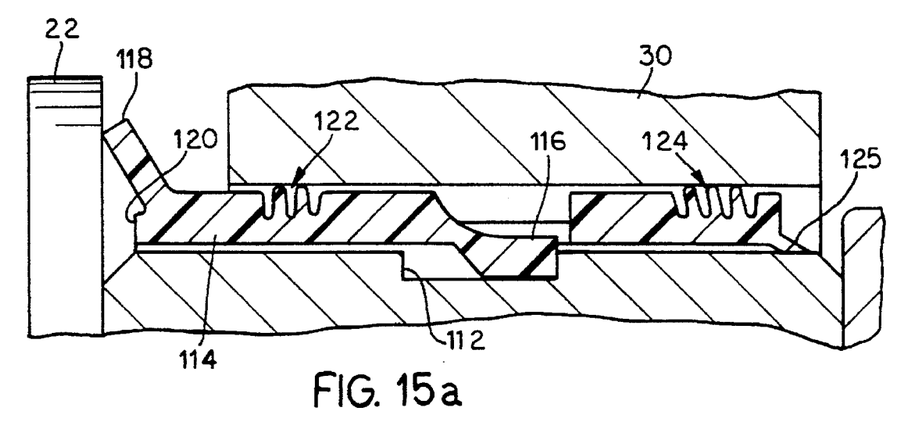
FIG. 15a is a view taken on line 15a showing the initial movement of the bushing assembly.

Referring to FIGS. 14 through 17, a step by step showing of the operation of the bell spring 118 in reducing wear of the brake pad 34. As shown in FIG. 14 the brake caliper is centered over the brake disc 16 with brake pads 40 and 34 equally spaced on each side of the disc 16. In FIGS. 15 and 15a, the bell spring 118 is shown in precompressed engagement with the washer 22 and the tabs 116 seated in the notch 112. The brake pad 40 is shown in abutting engagement with the brake disc 16 and the tab 116 abutting the end of the notch 112.

Figure 16:
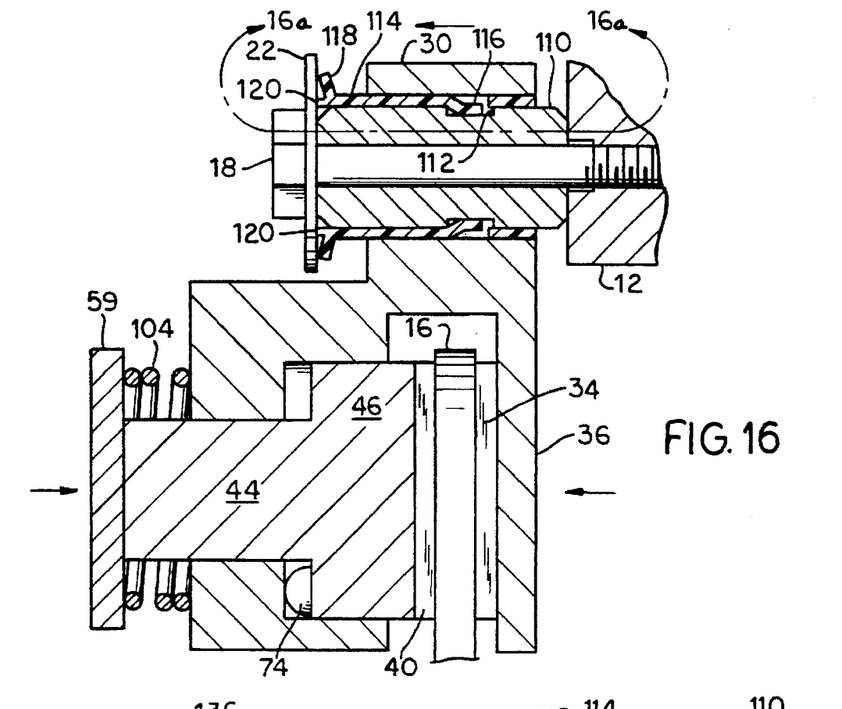
FIG. 16 is a view similar to FIG. 14 showing the movement of the bridge section into engagement with the disc.
Figure 16A:
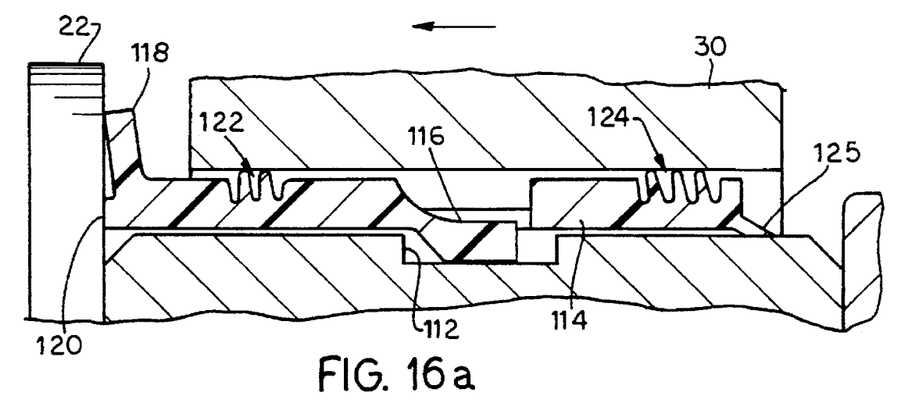
FIG. 16a is a view taken on line 16a of FIG. 16.

In FIGS. 16 and 16a the bridge section 30 has moved toward the washer 22 and the brake pad 34 has moved into engagement with the brake disc 16a due to the action of the ball ramp assembly 74. The end 120 on the sleeve 114 has moved into engagement with the washer 22 bending the flange 118.

Figures 17, 18:
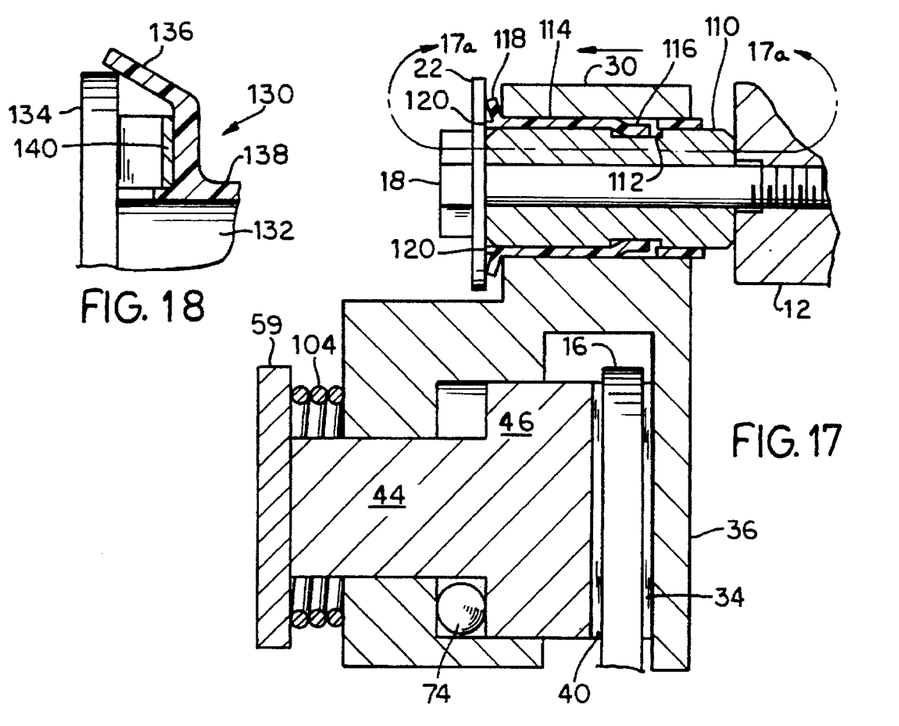
FIG. 17 is a view similar to FIG. 14 showing the movement of the flange into abutting engagement with the washer in a condition of substantial pad wear and compensation thereof.
FIG. 18 is an alternate form of the bell spring seal assembly.
Figure 17A:
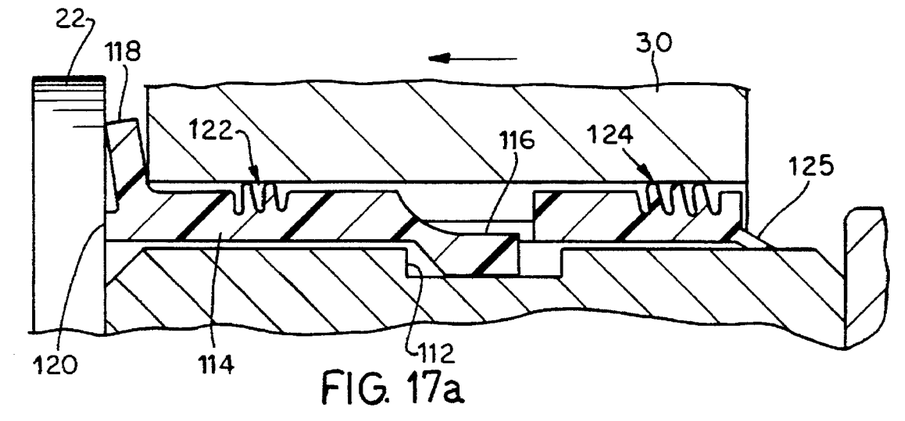
FIG. 17a is a view taken on line 17a of FIG. 17.

In FIGS. 17 and 17a the ball ramp assembly 74 has moved the housing 30 toward the washer 22 seating the flange 118 against the washer 22. When the brake is released, the rotor shaft 44 and head 46 are returned to their initial positions. The brake pad 34 on the housing 30 is released from engagement with the brake disc 16 by the bell spring 118. It should be noted that the bell spring 118 forces the sleeve 114 to push the housing 30 and stops when the tab 116 engages the end of the notch 112.

The mount sleeve 114 allows for constant proper positioning of the housing 30 in compensation for the wear in friction pad 34. FIGS. 15 and 15a describe the sleeve position prior to initial housing movement due to ball ramp actuation. Flange 118 has only a small preload on it maintaining a seal at washer 22 and abutted engagement to groove 112 in bushing 102 with tab 116.

FIGS. 16 and 16a denote normal actuation and no pad wear or compensation thereof. Flange 118 is deflected as the housing 30 is urged toward the washer 22 during brake application. Flange 118 deflection occurs because the force to slide the housing 30 over the crush seals 122 and 124 many times exceeds that to compress flange 118 to stop 120.

FIGS. 17 and 17a denote a pad wear condition whereas not only has the movement of housing 30 been adequate to make contact of the sleeve stop 120 to the washer 22 but further movement of the housing 30 toward the washer has caused slippage of the housing 30 over the crush ribs 122 and 124, ensuring proper new positioning of the housing 30 about its mount and the same retraction it always had, dictated by the gap between face 120 and washer 22 at rest position. With this feature for pad wear the gap between pad 34 and the disc 16 at brake off position remains constant for the life of the friction pad.

It should be noted that a wiper seal 125 is provided on the other end of the sleeve 114. The seals 118, 122, 124 and 125 completely enclose the bushing from contaminants. An alternate form of a bell spring seal assembly 130 is shown in FIG. 18 wherein the bushing 110 and washer 22 are formed in one piece. The seal assembly 130 includes a bushing 132 and a flange 134. A bell spring 136 is formed on the sleeve 138 which forms a seal with the edge of flange 134. A wave spring 140 is positioned between the flange 134 and bell spring 36.

Thus, it should be apparent that there has been provided in accordance with the present invention a parking brake that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A caliper brake assembly adapted to be mounted on a housing in a position to engage a brake disc, said assembly comprising:
    a caliper having an inboard leg and an outboard leg aligned with the brake disc,
    a brake pad mounted on each leg in alignment with each side of the brake disc,
    a rotor 40 mounted on the outboard leg in a position to engage the brake pad,
    a ball/ramp assembly positioned between said outboard leg and said rotor for moving said brake pads into engagement with the brake disc,
    means for supporting said caliper on the housing in a position to bridge the disc, said supporting means including a pair of screws, each screw having a bushing and a washer mounted thereon, a plastic sleeve mounted on each of the bushings for slidingly supporting the housing on the bushing, and a bell spring formed on one end of each of said sleeves and located in a position to engage the washer to bias the sleeve away from the washer whereby said caliper is moved sufficiently to relieve the pressure of the brake pads on the disc.

2. The brake assembly according to claim 1 including a ball retainer positioned between said rotor and said caliper for maintaining a fixed distance between said balls.

3. The brake assembly according to claim 1 including means for sealing said plastic sleeve in the bushing.

4. The brake assembly according to claim 3 wherein said bushing includes a notch intermediate the ends of the bushing and said plastic sleeve includes a pair of tabs aligned in said notch to limit the return motion of the sleeve.

5. The brake assembly according to claim 4 wherein said bell spring includes means for sealing the bell spring to the washer.

6. A caliper brake assembly adapted to be mounted in a housing for applying a braking force to a brake disc, the brake assembly comprising:

a caliper positioned to straddle the disc, a first brake pad assembly mounted on the caliper on one side of the disc, a second brake pad assembly mounted on the caliper on the other side of the disc, means for moving one of the brake pads into engagement with the disc and means for supporting said caliper for movement into engagement with the disc of the second brake pad assembly, said supporting means including a pair of screws, a bushing and a washer mounted on each of the screws, a notch formed in each of the bushings intermediate the ends thereof, a plastic sleeve mounted on each of the bushings for slidingly supporting the caliper on the bushings, a tab formed in each plastic sleeve in a position to engage one side of the notch to limit the return motion of the plastic sleeve, and a bell spring formed on one end of each of the sleeves to bias the caliper away from the washer.

7. The brake assembly according to claim 6 wherein said moving means includes a rotor having a head at one end, a number of ramps equally spaced around one side of said head and a number of balls corresponding to the number of ramps.

8. The brake assembly according to claim 7 including a ball retainer for maintaining equal spacing of said balls around the head of the rotor.

9. The brake assembly according to claim 6 wherein each bell spring includes a sleeve stop positioned to engage the washer, a pair of crush ribs formed on said sleeve to sealingly support the caliper on the sleeve and a seal formed on the other end of the bushing to engage the bushing.

10. The brake assembly according to claim 9 including a wiper seal formed on one end of the sleeve in a position to sealingly engage the bushing.

* * * * *